July 21, 1931.  G. W. HEISE  1,815,508
ELECTRIC CELL
Filed June 2, 1928
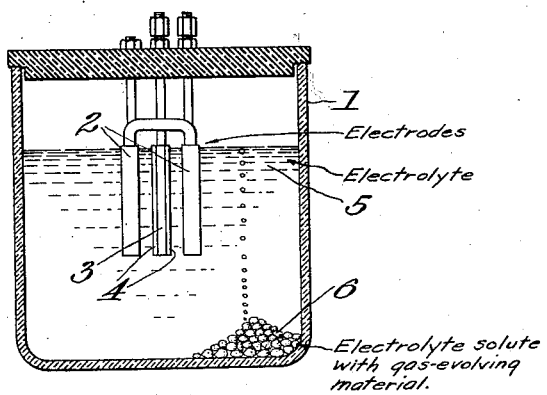
Inventor.
George W. Heise,
By Byrnes Townsend & Brickenstein,
Attorneys Patented July 21, 1931

1,815,508

UNITED STATES PATENT OFFICE

GEORGE W. HEISE, OF LAKEWOOD, OHIO, ASSIGNOR TO NATIONAL CARBON CO., INC., A CORPORATION OF NEW YORK

ELECTRIC CELL

Application filed June 2, 1928. Serial No. 282,315.

My invention relates to electric cells, and particularly to means for aiding the solution of the electrolyte substance therein. My invention has for one of its objects, the provision of an automatic means for stirring the electrolyte mixture during the solution of the electrolyte substance therein, to prevent the formation of a caked, relatively slowly soluble mass of solid, as well as the production of other advantages.

The so-called copper oxide type of primary battery cell involving a zinc electrode, a caustic electrolyte solution, a copper electrode and a copper oxide depolarizer, is found to have a wide range of utility, particularly for such fields as railway signal system operation. It is customary to prepare a substantial number of cells for service simultaneously for such uses and difficulty has been encountered in the preparation of the electrolyte, since if the solid caustic soda for the electrolyte is thrown into the bottom of the jar, and the necessary quantity of water added, the heat of solution may result in a fusing of the caustic into a solid cake, which, because of the high specific gravity of solution in contact therewith, may remain undissolved for considerable periods of time, and the solution may not be of uniform concentration throughout the container, injuring the efficiency of the battery.

My invention provides simple means for the automatic stirring and agitating of the electrolyte substance and solvent, so that the materials may be thrown together within a jar, and without further attention from the assembler, will go into complete uniform solution without the production of a fused cake.

By the means of my invention I am thus enabled to facilitate the preparation of a battery for service.

Other objects and details of my invention will be apparent from the following description when read in connection with the accompanying drawing; wherein The single figure is a diagrammatic representation of an electric cell embodying my invention.

In the figure I have shown the customary container 1, zinc electrode 2, copper electrode 3, and copper oxide depolarizer 4. In connection with this assembly, I provide a quantity of water 5, and a special electrolyte substance 6.

The electrolyte substance may desirably comprise such a quantity of caustic soda, with or without the inclusion of other caustic substances, as will produce, when dissolved in the suitable quantity of water 5, a caustic solution of the desired concentration, about 25%. Incorporated in the caustic material 6, I provide a substance adapted to develop a substantial quantity of gas, which upon being liberated, will stir and agitate the mixture. This substance may comprise calcium carbide, which in contact with water generates gaseous acetylene. Alternately, it may comprise a quantity of sodium peroxide, which in contact with water produces gaseous oxygen. Or it may comprise certain metals such as zinc, metallic sodium, metallic aluminum, or other reactive metals, which in contact with the caustic solution will liberate hydrogen.

The gas liberating material may be mixed with the caustic solid in any convenient way. Under certain conditions it may simply be mixed freely with the caustic, as may be the case when sodium peroxide is used, the protection provided against moisture and carbon dioxide for the caustic being sufficient for the protection of the sodium peroxide. Alternatively, the material may be protected, separately from the caustic solid, as by a covering of aluminum paint, or by enclosure in an appropriate canister with suitable closure means.

If calcium carbide or sodium peroxide are chosen the reaction for the liberation of a gas occurs directly with the water in the solute for the production of the gas, which may occur within the pores of the solid caustic, thereby breaking up the caustic and producing a vigorous agitation of the liquid, carrying the more concentrated portions of the solution into the less concentrated portions, and producing a very satisfactory stirring of the solution and a complete dissolving of the solid caustic substance. In the event that sodium peroxide is used, which, in contact with water yields oxygen and caustic soda, it may replace a portion of the caustic soda otherwise needed for the electrolyte, and at the completion of the reaction, no harmful material is left in the cell. In the event that calcium carbide is used, a small quantity of calcium hydroxide remains behind in the cell which is, however, harmless and may replace a portion of the caustic.

Alternatively, a free metal may be used. If metallic sodium is utilized, an equally satisfactory stirring of the solution, by the evolved hydrogen, is obtained and an additional portion of caustic soda is supplied to the electrolyte. If metallic aluminum is used, it likewise evolves hydrogen freely and actively producing the desired stirring in an entirely satisfactory maner. The aluminum may desirably be included in a granular form, large enough to provide good sized bubbles of gas. The aluminum dissolves directly in the caustic solution without the intervention of any other material, and the quantity required need only be small. It reacts with a small portion of the caustic electrolyte material and leaves in the cell a small amount of sodium aluminate. This material is, however, harmless and the utilization of caustic material is sufficiently small to be negligible in its effect on the output of the cell.

Alternatively, metallic zinc may be utilized to produce the agitating gas, in which case a more electro-positive metal such as iron, or copper, or other suitable substance, is desirably included, to facilitate the solution of the zinc in the caustic and the evolution of the desired bubbles.

The quantity of each of the respective materials required depends upon the size of the cell and the quantity of electrolyte being prepared. In the case of an ordinary size of cell, utilizing 2 to 3 litres of electrolyte with 500 g. to 750 g. of caustic material, about 2½ litres of evolved gas are found sufficient to produce the desired agitation of the solvent. This quantity of gas may be obtained by the inclusion of about 5 grams of calcium carbide with the caustic solid. The same quantity of gas is liberated by approximately 16 grams of sodium peroxide, about 6.5 grams of zinc, or about 2 grams of aluminum.

The residues from such quantities of any of these substances are harmless and without deleterious effect upon the service capacity of the battery.

This device of my invention is highly desirable with the usual solid anhydrous caustic substance when it is utilized for the preparation of battery electrolyte. It is, however, even more desirable when utilized with a more readily soluble electrolyte, such as the caustic monohydrate material disclosed in my copending application Serial No. 281,459, filed May 29, 1928, since such substance is more readily soluble and sufficient agitation of the solvent is obtained with a smaller quantity of the gas evolving substance.

The device of my invention above disclosed is valuable with any type of cell to which it is applicable. It is, however, especially desirable in the case of a cell which it is desired to assemble completely at the factory except for the inclusion of the electrolyte solvent, in which the cell may be prepared for use merely by the insertion of the desired quantity of water through a small opening in the cell cover. In the case of cells so prepared adequate stirring is not readily obtained and difficulty has been encountered in obtaining a complete and uniform solution of the caustic substance. The device of my invention avoids this difficulty and accordingly makes commercially feasible the preparation of an assembled cell at the factory, the shipment thereof to the field of usage, and the simple, rapid, easy putting into service thereof.

While I have shown but a limited number of embodiments of my invention, it is capable of still other modifications therefrom without departure from the spirit thereof, and it is desired, therefore, that only such limitations shall be imposed upon the appended claims as are stated therein or required by the prior art.

I claim as my invention:

1. In a battery having a container, electrodes, and a solid soluble electrolyte substance, means in combination therewith comprising a gas evolving material therein for the agitation of the electrolyte substance during dissolving action.

2. An electrolyte material for a battery, comprising a solid soluble substance adapted to be dissolved in a liquid to react with an electrode, and a gas evolving auxiliary substance associated therewith, adapted to evolve an agitating gas during the solution of said electrolyte substance in the battery solvent.

3. In a complete, dry, assembled electric cell, a solid mixture comprising an electrolyte material adapted to react with an electrode for the generation of electricity and an auxiliary substance adapted to evolve gas upon the addition of water thereto.

4. A combination of materials for producing a battery electrolyte comprising a caustic alkali solid, and a substance associated therewith adapted to produce a gas upon reaction with a liquid.

5. A combination of materials for producing a battery electrolyte comprising a caustic alkali solid, a substance mixed therewith adapted to produce a gas when in contact with a liquid and a liquid in sufficient quantities to dissolve said caustic alkali solid.

6. The method of preparing a liquid electrolyte which comprises mixing a solid electrolyte substance with an auxiliary substance which evolves gas when acted upon by a liquid, and immersing the mixture in a liquid.

7. The method of preparing a liquid electrolyte which comprises mixing about 125 parts of caustic soda with about 1 part of calcium carbide and immersing the mixture in water.

8. The method of preparing a liquid electrolyte which comprises mixing a caustic alkali material with calcium carbide and immersing the mixture in water.

9. In a complete dry assembled electric cell, a container, an electrolyte producing material within said container, said material comprising an electrolyte solute and an auxiliary substance associated therewith adapted to evolve gas upon the addition of water to said electrolyte material, and means for excluding the atmospheric moisture from said auxiliary substance until water is to be added thereto.

In testimony whereof, I affix my signature.

GEORGE W. HEISE.